United States Patent
Patterson

(10) Patent No.: US 7,341,521 B1
(45) Date of Patent: Mar. 11, 2008

(54) LIMITED PLACEMENT JOYSTICK CONTROL SYSTEM

(76) Inventor: David G. Patterson, 3834 N. Garver Rd., Dayton, OH (US) 45415

( * ) Notice: Subject to any disclaimer, the term of this patent is extended or adjusted under 35 U.S.C. 154(b) by 368 days.

(21) Appl. No.: 11/040,648

(22) Filed: Jan. 21, 2005

Related U.S. Application Data

(60) Provisional application No. 60/538,294, filed on Jan. 23, 2004.

(51) Int. Cl.
*A63F 13/00* (2006.01)
(52) U.S. Cl. ............... 463/38; 700/85; 345/161; D14/412; 434/45
(58) Field of Classification Search ........... 463/36–38; 345/156–184; 700/85; D14/412; 74/471 R, 74/473.1–473.15, 473.32–473.35, 471 XY, 74/479.01; 701/1; 341/20; 434/29–30, 434/45; 248/346.01, 346.03; 73/1.57–1.72, 73/23.27, 23.29, 30.02, 31.04
See application file for complete search history.

(56) References Cited

U.S. PATENT DOCUMENTS

| | | | | |
|---|---|---|---|---|
| 3,907,053 A | * | 9/1975 | Savage | 180/6.48 |
| 4,493,219 A | * | 1/1985 | Sharp et al. | 73/862.05 |
| 4,716,399 A | * | 12/1987 | Nordlund | 250/234 |
| 5,125,602 A | * | 6/1992 | Vauvelle | 244/223 |
| 5,377,950 A | * | 1/1995 | Salcudean et al. | 248/581 |
| 5,409,226 A | * | 4/1995 | Mesko et al. | 273/148 B |
| 5,692,541 A | * | 12/1997 | Brown | 137/636.2 |
| 5,854,622 A | * | 12/1998 | Brannon | 345/161 |
| 6,271,828 B1 | * | 8/2001 | Rosenberg et al. | 345/156 |
| 6,285,356 B1 | * | 9/2001 | Armstrong | 345/167 |
| 6,986,249 B2 | * | 1/2006 | Bernard | 60/571 |
| 7,011,274 B1 | * | 3/2006 | Hardoin | 244/17.23 |

* cited by examiner

*Primary Examiner*—John Hotaling
*Assistant Examiner*—Damon Pierce
(74) *Attorney, Agent, or Firm*—Jacox, Meckstroth & Jenkins

(57) ABSTRACT

A joystick control system includes a first pair and a second pair of fluid enclosed resilient tubes with each pair of tubes having generally parallel spaced pressure sensing portions confined within a support housing with one pair of sensing portions disposed perpendicular to the other pair of sensing portions. A control stick extends between the spaced sensing portions of both pairs of tubes and is supported for slight lateral or universal tilting movement. Each pair of tubes is connected to a corresponding sensing transducer which varies electrical output signals according to the pressure applied to the sensing portions of the tubes by the control stick.

10 Claims, 2 Drawing Sheets

US 7,341,521 B1

LIMITED PLACEMENT JOYSTICK CONTROL SYSTEM

FIELD OF THE INVENTION

This invention relates to an input device for personal computers and which emulates the feel of modern fighter aircraft joysticks, also known as side stick controllers (SSC). A SSC controls the pitch and roll axes of the aircraft in response to pilot applied stick force, with little or no stick displacement. The invention is especially suited for use as a side stick controller for an in-flight simulator and for the computer gaming industry.

BACKGROUND OF THE INVENTION

Traditional joysticks for computer gaming utilize a pivotally supported stick for input, where the magnitude of displacement is on the order of plus/minus 25 degrees and is proportional to the desired output signal. The input stick is mechanically linked to two potentiometers, one for each of two axes of input. The potentiometers receive 5-volts direct current (DC) from the computer and translate the displacement into a varying signal, usually from zero to five volts. The signal is read directly by the computer, without the need for further manipulation of circuitry.

SUMMARY OF THE INVENTION

A limited displacement joystick control system constructed in accordance with the invention is herein referred to as a joystick device or system and does not rely on displacement for user input, but rather on an applied force against an almost stationary or fixed stick. As such, the system is especially suited for mimicking the pitch and roll controller found on many modern fighter and commercial aircraft. These controllers sense an applied stick force through the use of expensive strain gauges and require a complex interface system to translate the input force into a signal recognized by the flight systems computer.

The joystick device or system of the invention emulates the potentiometers of conventional joysticks and may be interfaced to a personal computer via any method that currently uses a gaming joystick, including the original 15-pin joystick connector still found on the back of most computers, and the more modern Universal Serial Bus (USB) interface. The hardware requirements for the system are further simplified by using the computer's 5-volt power supply, supplied through the existing joystick interface.

Typical applications of the device or system of the invention range from the home entertainment market to commercial and military flight simulators where alternatives to displacement joysticks and the more expensive flight-worthy systems are desired. In addition, the small physical footprint or compactness of the device allows it to fit into the small area or space currently allotted to a flight-worthy device in the cockpit of a modern fighter aircraft.

Other features and advantages of the invention will be apparent from the following description, the accompanying drawings and the appended claims.

DESCRIPTION OF THE PREFERRED EMBODIMENT

Figure 1:
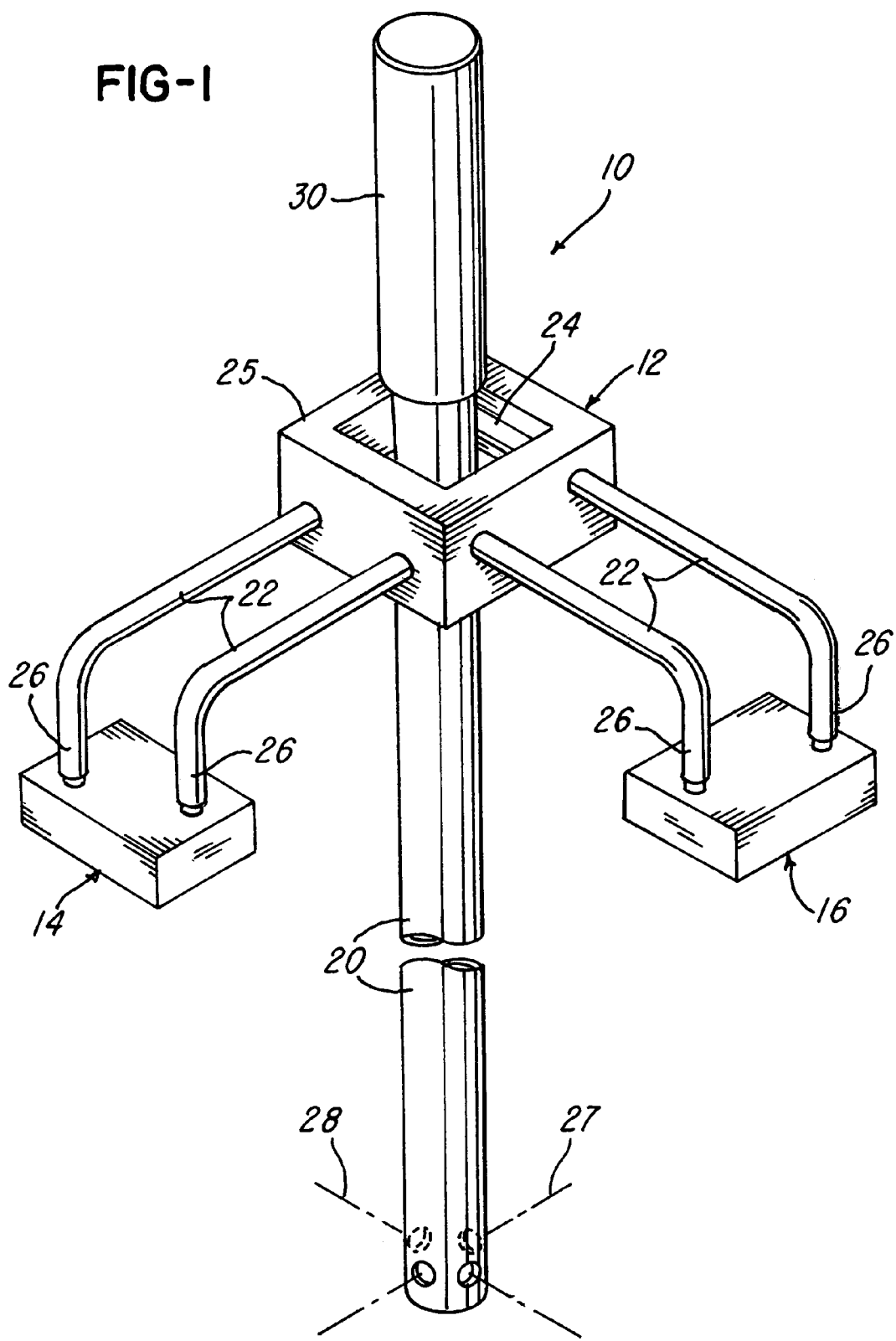
FIG. 1 is a perspective view of a joystick sensor assembly and control system constructed in accordance with the invention.
Figure 2:
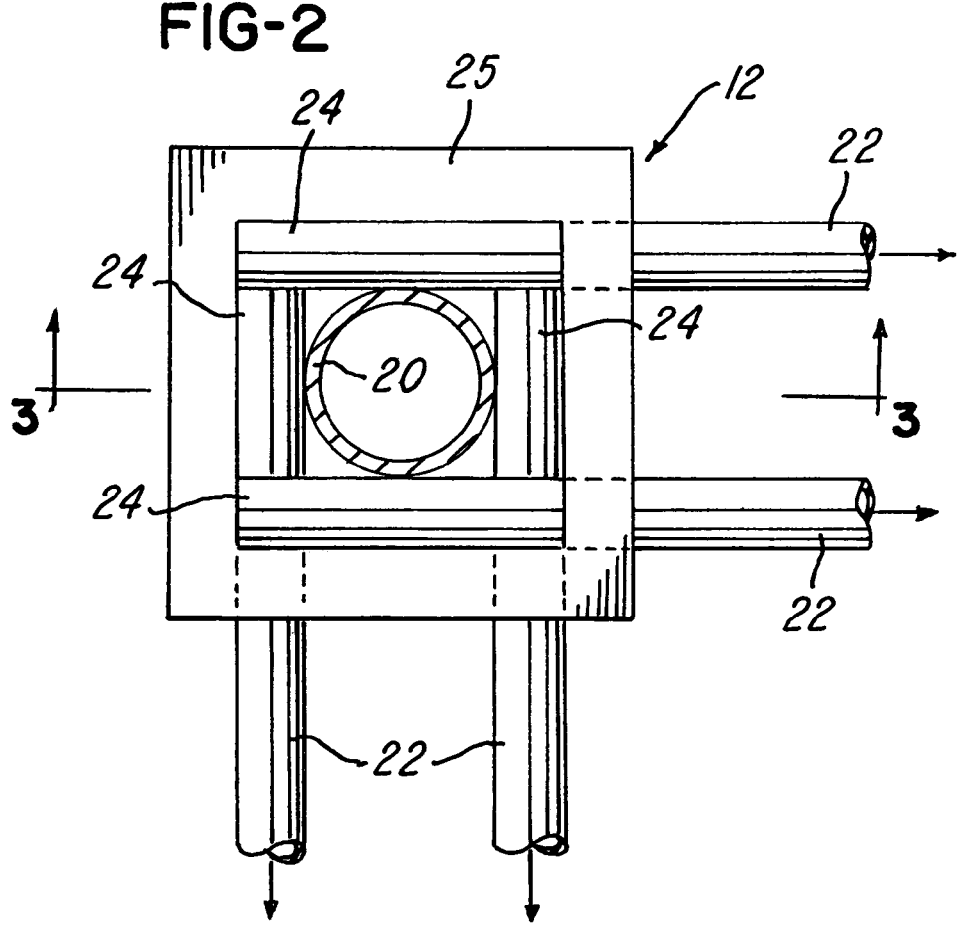
FIG. 2. is a fragmentary plan view of the sensor assembly with the joystick shown in section.
Figure 3:
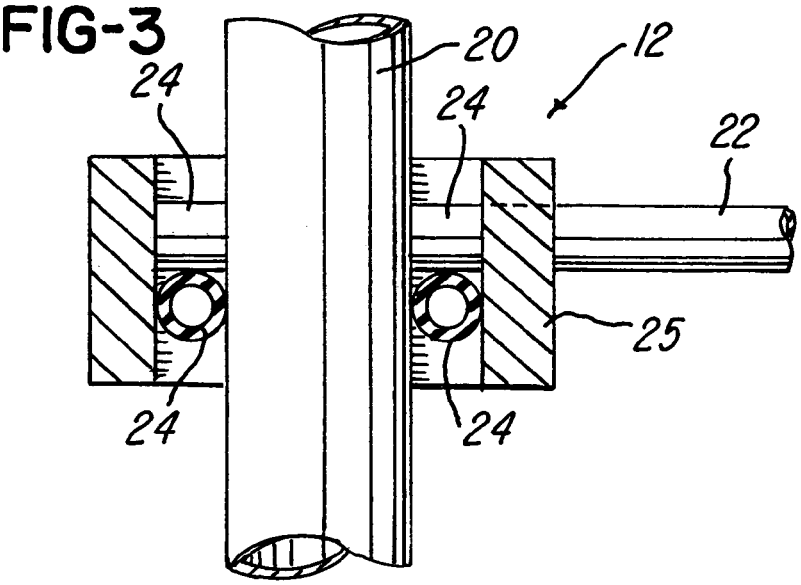
FIG. 3 is a fragmentary axial section taken generally on the line 3-3 of FIG. 2.

A joystick control system 10 of the invention generally includes a sensor unit or assembly 12, two pressure transducers 14 and 16 with their associated electronics and computer interface cable, and a control rod or stick 20. Two pair of elongated resilient or rubber tubes 22, one for the up/down pitch and one for the left/right roll, are filled with a fluid such as atmospheric air, and each pair of tubes have plugged or closed parallel spaced end portions 24. The spaced portions 24 are confined within a support member in the form of an aluminum frame-like housing 25, and the spaced portions function as input sensors. The pairs of sensing tubes 22 have opposite end portions 26 connected to corresponding pressure transducers 14 and 16 so that each tube 22 functions as a sealed fluid or air chamber. The control stick 20 is preferably supported at its lower end portion so that the stick pivots universally on two perpendicular axes 27 and 28. The control stick 20 extends through the center of the housing 25 (FIG. 2) where it is surrounded by and contacts the spaced portions 24 of the four sensing tubes 22.

When one or two of the tubes 22 are compressed slightly by the control stick 20 in response to user input pressure on a hand grip 30, one or both of the two transducers 14 and 16 sense the resultant increase in internal air pressure and vary the output signal or signals to a computer through the transducers 14 and/or 16. One form of transducers 14 and 16 which has performed with satisfactory results is produced by Sensym, Incorporated and sold under the trademark SenSyme® Amplified SCX Series. The published description of these transducers is herein incorporated by reference.

A circuitry external to each pressure transducer 14 and 16 adjusts the voltage output to 2.5 VDC when the stick 20 is in its normal resting or center position, and the output signal is seen by the computer. By using a two-port differential pressure transducer for each of the transducers 14 and 16 with a 2.5 VDC resting output, such as the SenSym pressure sensor mentioned above, only one transducer is required to read both directions of movement of the stick on each axis for example, pitch up/down. The transducer output varies from zero to 5 VDC in response to pressure changes at the two ports. The computer interprets zero and 5 volts as full-scale inputs for example, full pitch up and full pitch down, and 2.5 volts as no input. Stick sensitivity may be adjusted by changing the length of the sensing tubes 22, and the force required to move or slightly tilt the stick 20 may be increased by introducing stiffness at the universal pivot support for the stick on the axes 27 and 28.

From the drawings and the above description, it is apparent that a joystick control system constructed in accordance with the invention provides desirable features and advantages. For example, the simplicity of the system provides substantially lower cost when compared with a flight worthy controller used in aircraft and simulators. In addition, the pressure transducers 14 and 16 provide for a direct interface to a personal computer either by a 15-pin joystick port or by a universal serial port (USB). The compactness of the system is also highly desirable, and the sensitivity of the system may be easily adjusted by changing the length of the sensor tubes 22. As apparent from FIG. 2, the sensor tubes also provide for automatically centering the control stick 20 and thus eliminate the need for centering springs as commonly used in conventional joystick systems.

While the form of joystick control system herein described constitutes a preferred embodiment of the invention, it is to be understood that the invention is not limited to this precise form, and that changes may be made therein without departing from the scope and spirit of the invention as defined in the appended claims.

What is claimed is:

1. A joystick control system adapted for use with a computer game or an in-flight aircraft simulator, comprising a support member, a first pair of parallel spaced resilient tubes enclosing a fluid, a second pair of parallel spaced resilient tubes enclosing a fluid, each said pair of resilient tubes positioned by said support member with said first pair of tubes disposed above and crossing said second pair of tubes at an angle, a control stick projecting between each said pair of said tubes and positioned to exert pressure laterally in a radial direction on said tubes, said control stick being supported for lateral movement with respect to each said pair of said parallel spaced tubes to produce an increase of fluid pressure within each said tube in response to radial pressure on said tube by said control stick, and a pressure sensing transducer connected to each said tube.

2. A system as defined in claim 1 wherein said tubes are cylindrical, and said fluid comprises a gas.

3. A system as defined in claim 2 wherein said gas comprises air.

4. A system as defined in claim 1 wherein an end portion of said control stick is supported for universal tilting movement of said control stick.

5. A system as defined in claim 1 wherein said support member comprises a housing confining and supporting each said pair of tubes, and said control stick extends through said housing.

6. A system as defined in claim 5 wherein said housing has a generally square support surface supporting each said pair of tubes with one said pair of tubes disposed perpendicular to and adjacent the other said pair of tubes.

7. A system as defined in claim 1 wherein one said pressure sensing transducer is connected to said first pair of said tubes, and a second said pressure sensing transducer is connected to said second pair of said tubes.

8. A joystick control system adapted for use with a computer game or an in-flight aircraft simulator, comprising a support member, a first pair of elongated cylindrical resilient tubes enclosing a fluid, a second pair of elongated cylindrical resilient tubes enclosing a fluid, each said pair of resilient tubes having substantially parallel spaced portions positioned within said support member with said spaced portions of said first pair of tubes disposed above and substantially perpendicular to and crossing said spaced portions of said second pair of tubes, a control stick projecting between said parallel spaced portions of each said pair of said tubes and positioned to exert pressure laterally in a radial direction on said spaced portions of said tubes, said control stick having an end portion supported for universal tilting movement to produce an increase of fluid pressure within each said tube in response to radial pressure on said tube by said control stick, and a pressure sensing transducer connected to each said tube.

9. A system as defined in claim 8 wherein said support member has a generally square support surface supporting said spaced portions of each said pair of tubes.

10. A system as defined in claim 8 wherein one said pressure sensing transducer is connected to said first pair of said tubes, and a second said transducer is connected to said second pair of said tubes.

* * * * *